(12) United States Patent
Suh et al.

(10) Patent No.: US 7,611,759 B2
(45) Date of Patent: Nov. 3, 2009

(54) POLARIZER, METHOD OF MANUFACTURING THE POLARIZER, APPARATUS FOR MANUFACTURING THE POLARIZER, AND DISPLAY APPARATUS HAVING THE POLARIZER

(75) Inventors: Duck-Jong Suh, Seoul (KR);
Bong-Sung Seo, Yongin-si (KR);
Dae-Ho Choo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 700 days.

(21) Appl. No.: 11/102,813

(22) Filed: Apr. 11, 2005

(65) Prior Publication Data
US 2005/0233096 A1 Oct. 20, 2005

(30) Foreign Application Priority Data
Apr. 19, 2004 (KR) .................. 10-2004-0026500

(51) Int. Cl.
*C09K 19/52* (2006.01)
*C09K 19/54* (2006.01)
*C09K 19/32* (2006.01)
*G02B 5/30* (2006.01)

(52) U.S. Cl. ............ 428/1.31; 252/299.01; 252/299.62; 252/299.5; 252/585; 349/96; 349/194

(58) Field of Classification Search ................ 428/1.31; 349/96, 194; 252/299.01, 299.5, 299.62, 252/585
See application file for complete search history.

(56) References Cited

U.S. PATENT DOCUMENTS

| 6,049,428 | A | * | 4/2000 | Khan et al. .................. 359/491 |
| 2004/0265593 | A1 | * | 12/2004 | Kamijo et al. ............ 428/411.1 |
| 2006/0119775 | A1 | * | 6/2006 | Nakata et al. ................ 349/119 |

FOREIGN PATENT DOCUMENTS

| EP | 1408351 | * | 4/2004 |
| JP | 2002350636 | * | 12/2002 |

OTHER PUBLICATIONS

Caplus 1996: 494034.*
English translation by computer for JP 2002-350636, http://www4.ipdl.inpit.go.jp/Tokujitu/PAJdetail.ipdl?N0000=60&N0120=01&N2001=2&N3001=2002-350636, (2002).*

* cited by examiner

*Primary Examiner*—Shean C Wu
(74) *Attorney, Agent, or Firm*—Cantor Colburn LLP (57) ABSTRACT

The present invention provides a polarizer that includes a supporting member and a liquid crystal polarizing layer that is coated on the supporting member. The liquid crystal polarizing layer includes liquid crystal molecules that are arranged in a predetermined direction and polarizing molecules that are combined with the liquid crystal molecules in order to absorb light oscillating in predetermined direction. The resulting polarizer is thin and highly effective.

6 Claims, 7 Drawing Sheets

POLARIZER, METHOD OF MANUFACTURING THE POLARIZER, APPARATUS FOR MANUFACTURING THE POLARIZER, AND DISPLAY APPARATUS HAVING THE POLARIZER

CROSS REFERENCE TO RELATED APPLICATION

This application claims priority to and benefit of Korean Patent Application No. 2004-26500 filed on Apr. 19, 2004, the contents of which are incorporated herein by reference for all purposes as if fully set forth in its entirety.

BACKGROUND OF THE INVENTION

1. Field of the Invention

The present invention relates to a polarizer, a method of manufacturing the polarizer, an apparatus for manufacturing the polarizer, and a display apparatus that has the polarizer. More particularly, the present invention relates to a thin polarizer and a more efficient method of manufacturing the polarizer. The present invention further relates to an apparatus for manufacturing the thin polarizer and a display apparatus that includes the thin polarizer.

2. Description of the Background

In general, a liquid crystal display apparatus includes a liquid crystal display panel that has a color filter substrate and an array substrate. The liquid crystal display panel includes a liquid crystal layer positioned between the array substrate and the color filter substrate to display an image.

An upper polarization plate is disposed on an upper face of the liquid crystal display panel, and a lower polarization plate is positioned beneath a bottom face of the liquid crystal display panel. The lower polarization plate polarizes light incident into the liquid crystal display panel, whereas the upper polarization plate polarizes light exiting the liquid crystal display panel.

The upper and lower polarization plates may be formed in accordance with the formation of iodine molecules or coloring molecules on extended films after films including poly vinyl alcohol (PVA) are respectively extended in predetermined directions. The iodine or the coloring molecules on the extended films may be arranged along predetermined directions to absorb lights oscillating in the predetermined directions, respectively.

When the extended films are deformed or deteriorated due to exposure to heat or moisture, the upper or lower polarization plate including the extended films may have distorted polarization axes so that light may not be polarized along a desired direction. This may lead to failure of the upper or lower polarization plates and the liquid crystal display apparatus.

In addition, the upper and lower polarization plates may respectively include protection layers to prevent heat or moisture from permeating into the upper and lower polarization plates, thereby preventing failure of the plates. However, the additional thickness of the protection layer causes the upper and lower polarization plates to be relatively thick.

SUMMARY OF THE INVENTION

The present invention provides a thin polarizer that has a greatly reduced volume.

The present invention also provides a method of manufacturing the polarizer with improved efficiency.

The present invention also provides an apparatus for manufacturing the polarizer.

The present invention still also provides a display apparatus including the above-mentioned polarizer.

Additional features of the invention will be set forth in the description which follows, and in part will be apparent from the description, or may be learned by practice of the invention.

The present invention discloses a polarizer that includes a supporting member and a liquid crystal polarizing layer disposed on the supporting member. The liquid crystal polarizing layer includes liquid crystal molecules and polarizing molecules. The liquid crystal molecules may be arranged in a predetermined direction and the polarizing molecules may absorb light that oscillates along the predetermined direction.

The present invention also discloses a display apparatus that includes a display panel that displays an image on it, a first liquid crystal polarizing layer that is positioned beneath a bottom face of the display panel, and a second liquid crystal polarizing layer that is disposed on an upper face of the display panel. The display panel includes a first substrate and a second substrate corresponding to the first substrate. The first liquid crystal polarizing layer includes first liquid crystal molecules combined with first polarizing molecules. The first liquid crystal molecules may be arranged in a first direction to absorb a first light that oscillates along the first direction. The second liquid crystal polarizing layer includes second liquid crystal molecules combined with second polarizing molecules. The second liquid crystal molecules may be arranged in a second direction to absorb a second light that oscillates along the second direction.

The present invention also discloses a display apparatus that includes a display panel, a first liquid crystal polarizing layer and a second liquid crystal polarizing layer. The display panel includes a first substrate, a second substrate corresponding to the first substrate, and a liquid crystal layer positioned between the first and the second substrates to display an image. The first liquid crystal polarizing layer includes first liquid crystal molecules disposed between the first substrate and the liquid crystal layer and arranged in a first direction. The first polarizing molecules are combined with the first liquid crystal molecules to absorb a first light oscillating in the first direction. The second liquid crystal polarizing layer includes second liquid crystal molecules and second polarizing molecules that are disposed between the liquid crystal layer and the second substrate. The second liquid crystal molecules may be arranged in a second direction. The second polarizing molecules are combined with the second liquid crystal molecules to absorb a second light oscillating in a second direction.

The present invention also provides a method of forming a polarizer. This method includes coating a solution of liquid crystal molecules on a supporting member in a predetermined direction. Polarizing molecules are added into the solution so that they combine with the liquid crystal molecules to absorb a light oscillating in the predetermined direction. A liquid crystal polarizing layer including the combined liquid crystal molecules and the polarizing molecules is formed on the supporting member by drying the supporting member having the combined liquid crystal molecules and the polarizing molecules thereon.

The present invention also provides an apparatus for manufacturing a polarizer including a coating member, a supply member and a drying member. The coating member coats a solution on the supporting member while moving in a predetermined direction. The solution may include liquid crystal molecules that are arranged in a first direction. The supply member provides the polarizing molecules into the solution so as to combine the polarizing molecules with the liquid crystal molecules. The drying member dries the supporting member having the liquid crystal molecules combined with the polarizing molecules. The result is a liquid crystal polarizing layer including liquid crystal molecules and the polarizing molecules on the supporting member. The liquid crystal molecules may be arranged in the first direction and the polarizing molecules are combined with the liquid crystal molecules to absorb a first light oscillating in the first direction.

It is to be understood that both the foregoing general description and the following detailed description are exemplary and explanatory and are intended to provide further explanation of the invention as claimed.

BRIEF DESCRIPTION OF THE DRAWINGS

The above and other features and advantages of the present invention will become readily apparent by reference to the following detailed description when considered in conjunction with the accompanying drawings.

DETAILED DESCRIPTION OF THE INVENTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like reference numerals refer to similar or identical elements throughout. It will be understood that when an element such as a layer, region or substrate is referred to as being "on" or "onto" another element, it can be directly on the other element or intervening elements may also be present.

Figure 1:
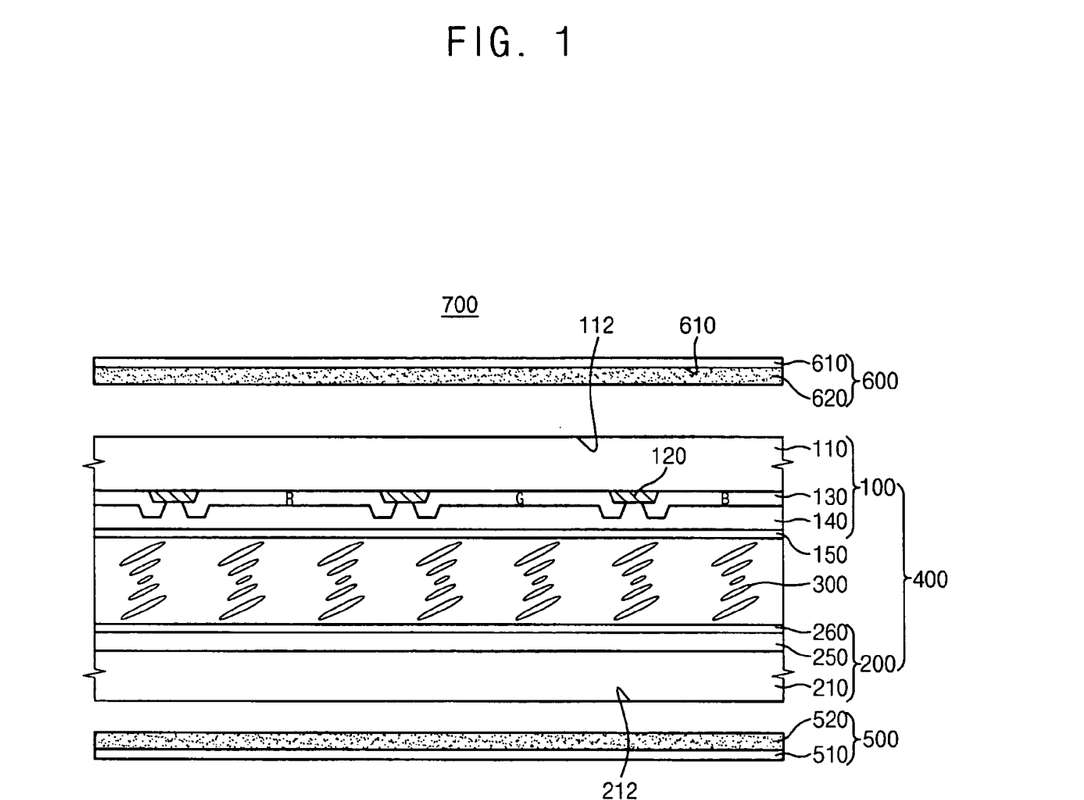
FIG. 1 is a cross sectional view that illustrates a liquid crystal display apparatus in accordance with one embodiment of the present invention.

FIG. 1 is a cross sectional view that illustrates a liquid crystal display apparatus in accordance with one embodiment of the present invention.

Referring to FIG. 1, a liquid crystal display device 700 includes a liquid crystal display panel 400, a first polarization plate 500 positioned beneath the liquid crystal display panel 400, and a second polarization plate 600 disposed on the liquid crystal display panel 400.

The liquid crystal display panel 400 includes a color filter substrate 100, an array substrate 200 corresponding to the color filter substrate 100, and a liquid crystal layer 300 disposed between the color filter substrate 100 and the array substrate 200.

The color filter substrate 100 has a first substrate 110, a color filter layer 130, a light blocking layer 120, a planarization layer 140 and a common electrode 150.

The first substrate 110 may include, but is not limited to, an insulation material such as glass, ceramic, etc. The color filter layer 130 including red (R) pixels, green (G) pixels and blue (B) pixels is formed on the first substrate 110.

The light blocking layer 120 is formed among the red, green and blue pixels to define boundaries of the RGB pixels, thereby improving color reproducibility of the RGB pixels. The light blocking layer 120 may include, but is not limited to, organic material, metal, metal oxide, etc. For example, the light blocking layer 120 may include black carbon (C), chrome (Cr), chrome oxide ($CrO_x$), etc.

End portions of the RGB pixels are extended toward the light blocking layer 120 to prevent a light from leaking between the light blocking layer 120 and the RGB pixels. Thus, the RGB pixels are partially overlapped with the light blocking layer 120. As a result, stepped portions may be generated between the RGB pixels and the blocking layer 120. That is, the stepped portions may be generated between the color filter layer 130 and the blocking layer 120.

The planarization layer 140 is disposed between the color filter layer 130 and the light blocking layer 120 so that the planarization layer 140 reduces the stepped portions generated between the color filter layer 130 and the blocking layer 120. An upper face of the color filter layer 100 is planarized in accordance with a formation of the planarization layer 140.

The common electrode 150 is formed on the planarization layer 140 to have a uniform thickness. The common electrode 150 may include a transparent conductive material such as indium tin oxide (ITO) or indium zinc oxide (IZO).

The array substrate 200 includes a second substrate 210, a thin film transistor (TFT) array 250 and a pixel electrode 260.

The second substrate 210 may include an insulation material such as glass or ceramic. The TFT array 250 is disposed on the second substrate 210. The TFT array 250 includes a plurality of thin film transistors (not shown). The thin film transistors are arranged on the second substrate 210 in a matrix configuration. The pixel electrode 260 may include a transparent conductive material such as ITO or IZO.

The first polarization plate 500 includes a first supporting member 510 and a first liquid crystal polarizing layer 520 formed on the first supporting member 510.

The first supporting member 510 may include a flexible film or a glass substrate. The first liquid crystal polarizing layer 520 includes liquid crystal molecules arranged in a first direction, and iodine molecules combined with the liquid crystal molecules to absorb a light that vibrates in the first direction.

The second polarization plate 600 includes a second supporting member 610, and a second liquid crystal layer 620 formed on the second supporting member 610. The second supporting member 610 may include a flexible film or a glass substrate.

The second liquid crystal polarizing layer 620 includes liquid crystal molecules arranged in a second direction. In addition, iodine molecules ($I_2$) are combined with the liquid crystal molecules to absorb a light that oscillates in the second direction. Here, the second direction may be substantially perpendicular to the first direction.

Figure 2:
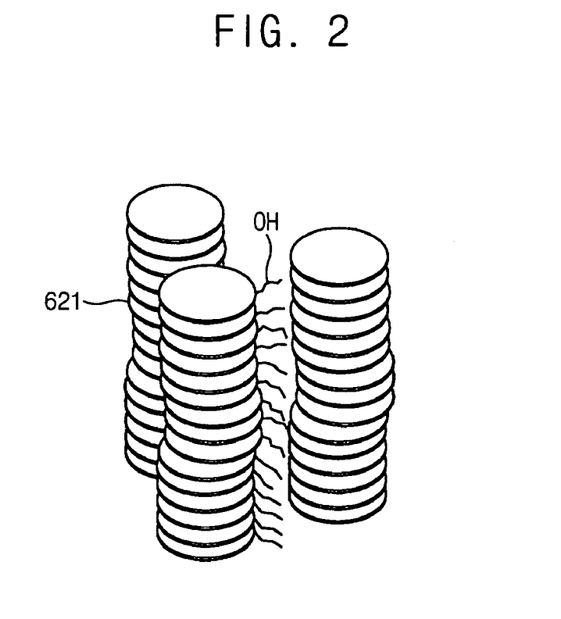
FIG. 2 is a perspective view that illustrates a liquid crystal material in a liquid state as in one embodiment of the present invention.

FIG. 2 is a perspective view that illustrates liquid crystal molecules in a liquid state as in one embodiment of the present invention. Referring to FIG. 2, liquid crystal molecules 621 including at least one hydroxyl group (—OH) are oriented in a predetermined direction. For example, the liquid crystal molecules 621 include at least one hydroxyl group and are represented in accordance with the following Formula 1, Formula 2, and Formula 3.

Formula (1)

In the Formula 1, M denotes a cation such as a hydrogen ion ($H^+$) or an ammonium ion ($NH_4^+$), R denotes hydrogen, bromine or hydrogen nitride aryl group, n may be 2 or 3, and m is an integer between and including 1 to 4.

Formula (2)

In the Formula 2, M denotes a cation such as a hydrogen ion ($H^+$) or an ammonium ion ($NH_4^+$), R denotes hydrogen, bromine or hydrogen nitride aryl group, n may be 2 or 3, and m is an integer between and including 1 to 4.

(3)

In the Formula 3, M denotes a cation such as a hydrogen ion ($H^+$) and or ammonium ion ($NH_4^+$), R denotes hydrogen, bromine or hydrogen nitride aryl group, n may be 2 or 3, and m is an integer between and including 1 to 4.

Figure 3:
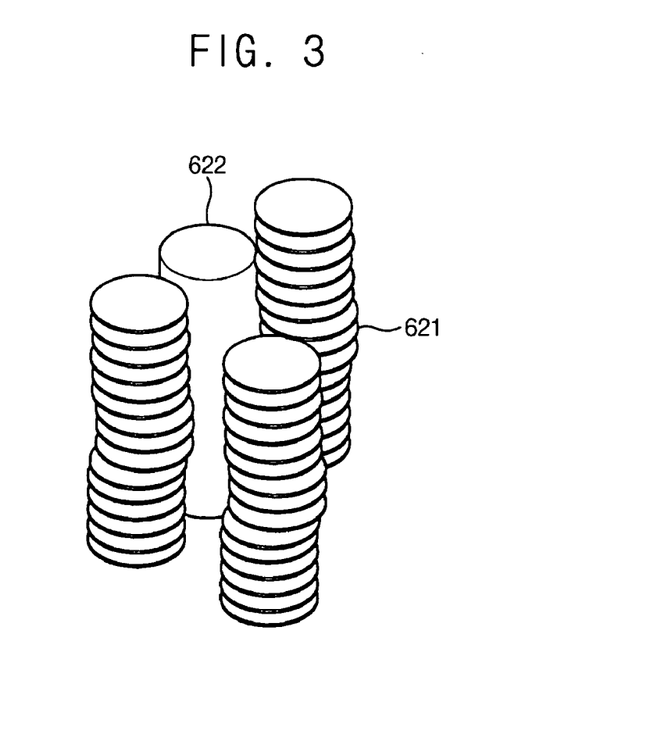
FIG. 3 is a perspective view that illustrates a liquid crystal material combined with iodine molecules as in one embodiment of the present invention.

FIG. 3 is a perspective view that illustrates liquid crystal molecules combined with iodine molecules as in one embodiment of the present invention.

Referring to FIG. 3, iodine molecules 622 are combined with the hydroxyl groups to be arranged in a predetermined direction that is substantially the same as that of the liquid crystal molecules 621. Accordingly, the first and second liquid crystal polarizing layers 520 and 530 polarize a light oscillating along the predetermined directions. In one embodiment of the present invention, coloring molecules (not shown) may be used instead of the iodine molecules 622.

As described above, the first and second polarization plates 500 and 600 include the first and second liquid crystal polarizing layers 520 and 620, respectively, that have the liquid crystal molecules 621 formed on the first and second supporting members 510 and 610, and the iodine molecules 622 combined with the liquid crystal molecules 621.

Generally, a dichroic ratio of the liquid crystal molecules 621 oriented in a predetermined direction may range from about 25 to about 30 percent. However, when the liquid crystal molecules 621 are combined with iodine molecules 622, the first and second liquid crystal polarizing layers 520 and 620 may have dichroic ratios of about 60 to about 80 percent, respectively.

In another embodiment of the present invention, the first and second polarization plates 500 and 600 may include surfactants. The surfactants may be added to the first and second liquid crystal polarizing layers 520 and 620 to improve the adhesion strength between the first liquid polarizing layer 520 and the first supporting member 510. In addition, the surfactants improve the adhesion strength between the second liquid polarizing layer 620 and the second supporting member 610.

Referring to FIG. 1, an adhesive member (not shown) may be provided to join the first polarization plate 500 to a bottom face 212 of the second substrate 210. The adhesive member may be an adhesive agent or an adhesive tape, for example. In one embodiment of the present invention, an additional adhesive member may be provided to join the second polarization plate 600 to an upper face 112 of the first substrate 110.

Figure 4:
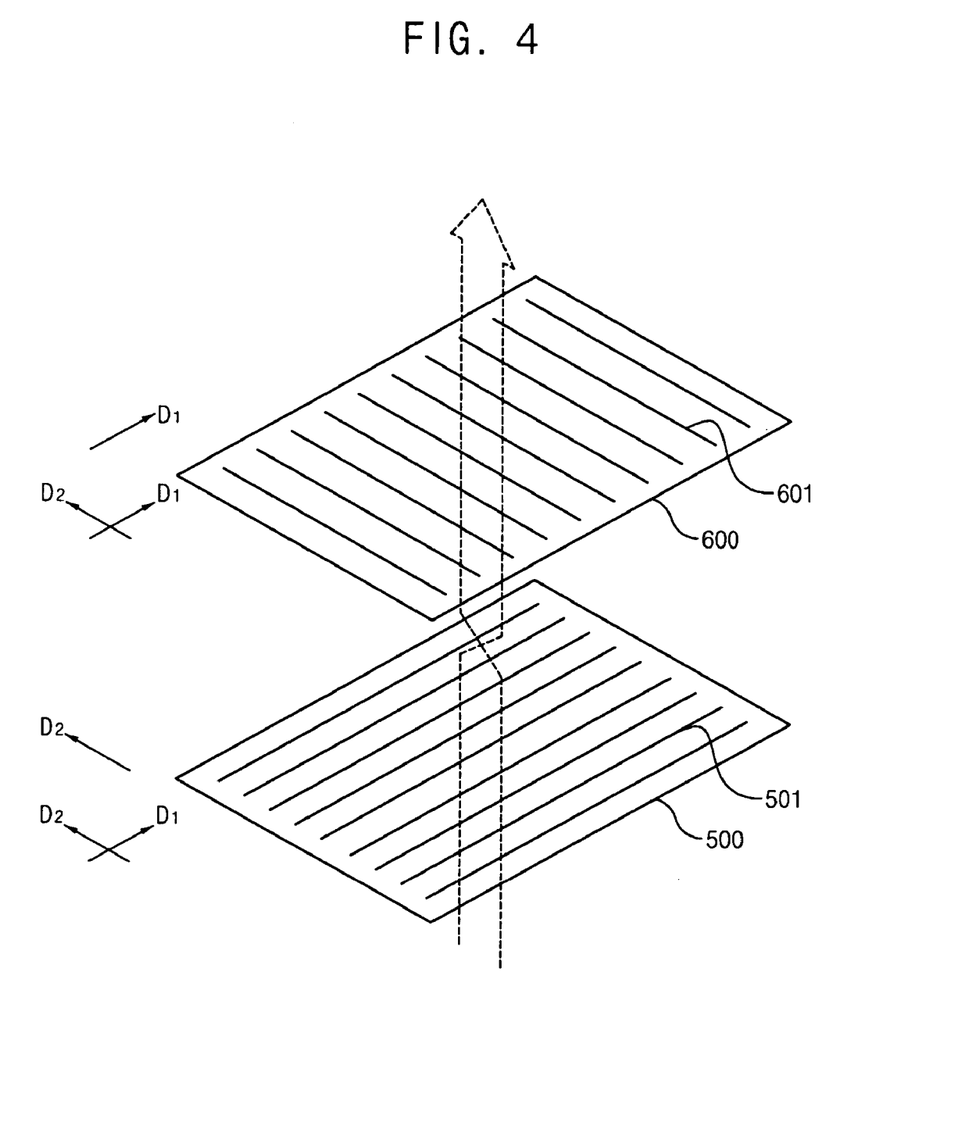
FIG. 4 is a perspective view that illustrates a first polarization plate and a second polarization plate in FIG. 1.

FIG. 4 is a perspective view illustrating the first and second polarization plates in FIG. 1.

Referring to FIGS. 1 and 4, the first polarization plate 500 includes a first polarization axis 501 that absorbs the light oscillating along a first direction D1, whereas the second polarization plate 600 has a second polarization axis 601 that absorbs the light oscillating in a second direction D2.

Accordingly, the first polarization plate 500 polarizes the light by absorbing the light oscillating along the second direction D2, whereas the second polarization plate 600 polarizes the light by absorbing the light oscillating along the first direction D1. The first polarization axis 501 is substantially perpendicular to the second polarization axis 601.

The light generated from a light generating member (not shown) disposed behind the first polarization plate 500 is polarized by the first polarization plate 500, and then the polarized light proceeds to the liquid crystal display panel 400 (see FIG. 1). After characteristics of the light incident into the liquid crystal display panel 400 are changed by the liquid crystal layer 300, the light is provided into the second polarization plate 600. The light exiting the liquid crystal display panel 400 is polarized by the second polarization plate 600.

As shown in FIG. 4, the first and second polarization plates 500 and 600 respectively have first and second polarization axes 501 and 601, respectively, that are substantially perpendicular to each other. In one embodiment of the present invention, a first polarization axis of the first polarization plate 500 may be substantially parallel to a second polarization axis of the second polarization plate 600. In another embodiment of the present invention, a first polarization axis of the first polarization plate 500 may be inclined relative to a second polarization axis of the second polarization plate 600 by a predetermined angle.

Figure 5:
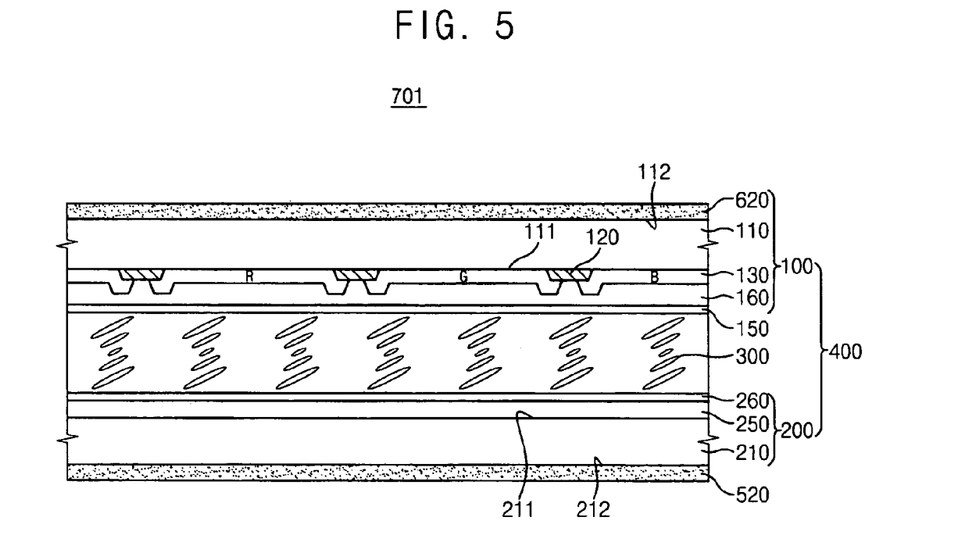
FIG. 5 is a cross sectional view that illustrates a liquid crystal display apparatus as in one embodiment of the present invention.

FIG. 5 is a cross sectional view illustrating a liquid crystal display apparatus in accordance with one embodiment of the present invention. In FIG. 5, the same reference numerals are used to refer to the same or like parts as those in FIG. 1.

Referring to FIG. 5, a liquid crystal display apparatus 701 includes a liquid crystal display panel 400 that has a first liquid crystal polarizing layer 520 and a second liquid crystal polarizing layer 620. The first liquid crystal polarizing layer 520 is formed beneath a bottom face 212 of the second substrate 210, and the second liquid crystal polarizing layer 620 is formed on an upper face 112 of the first substrate 110.

The liquid crystal display panel 400 includes a color filter substrate 100 and an array substrate 200.

The color filter substrate 100 has a first substrate 110, a color filter layer 130, a light blocking layer 120, a planarization layer 140, and a common electrode 150. The color filter layer 130, the light blocking layer 120, the planarization layer 140 and the common electrode 150 are positioned beneath a bottom face of the first substrate 110.

The array substrate 200 has a second substrate 210, a thin film transistor array 250 and a pixel electrode 260.

Since the first and second liquid crystal polarizing layers 520 and 620 are formed on the bottom face 212 and on upper face 112 of the liquid crystal display panel 400, respectively, the first and second supporting members 510 and 610 may be omitted. Hence, the liquid crystal display apparatus 701 may have greatly reduced thickness and volume.

Figure 6:
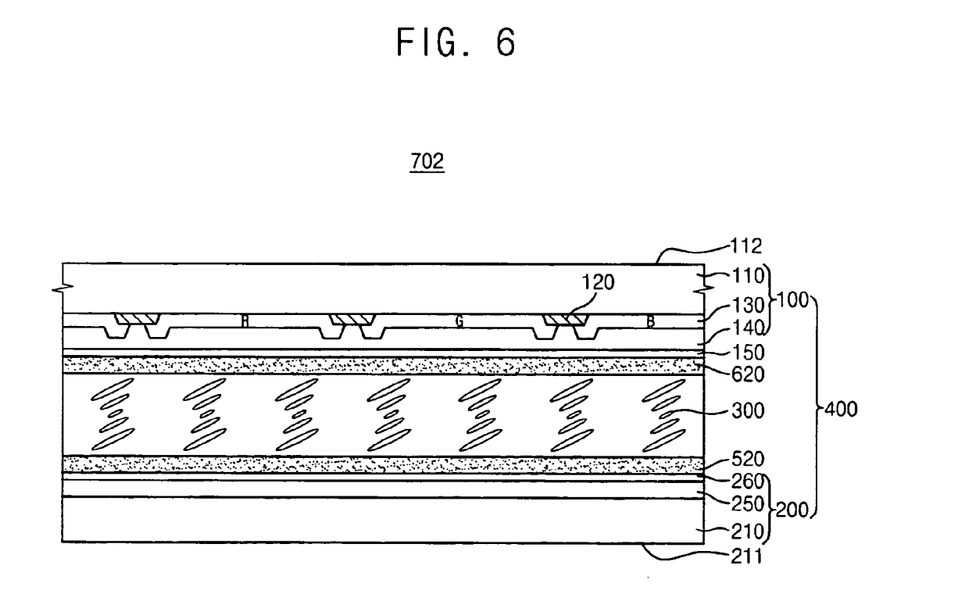
FIG. 6 is a cross sectional view that illustrates a liquid crystal display apparatus as in one embodiment of the present invention.

FIG. 6 is a cross sectional view illustrating a liquid crystal display apparatus in another embodiment of the present invention.

Referring to FIG. 6, a liquid crystal display apparatus 702 includes a color filter substrate 100, an array substrate 200, a liquid crystal layer 300. In addition, the apparatus has a first liquid crystal polarizing layer 520 and a second liquid crystal polarizing layer 620 that are preferably disposed between the color filter substrate 100 and the liquid crystal layer 300 and the array substrate 200 and the liquid crystal layer 300, respectively.

The first liquid crystal polarizing layer 520 is formed on a pixel electrode 260 positioned on the array substrate 200, and the second liquid crystal polarizing layer 620 is formed on a common electrode 150 disposed on the color filter substrate 100.

The first liquid crystal polarizing layer 520 may be formed at an outermost portion of the array substrate 200, and the second liquid crystal polarizing layer 620 may be formed at an outermost portion of the color filter substrate 100. Alternately, the liquid crystal polarization 520 may be formed between layers positioned on the array substrate 200, and the second liquid crystal polarizing layer 620 may be formed between layers positioned on the color filter substrate 100. Also, the second liquid crystal polarizing layer 620 may serve as the planarization layer 140 formed on the color filter substrate 620.

Figure 7:
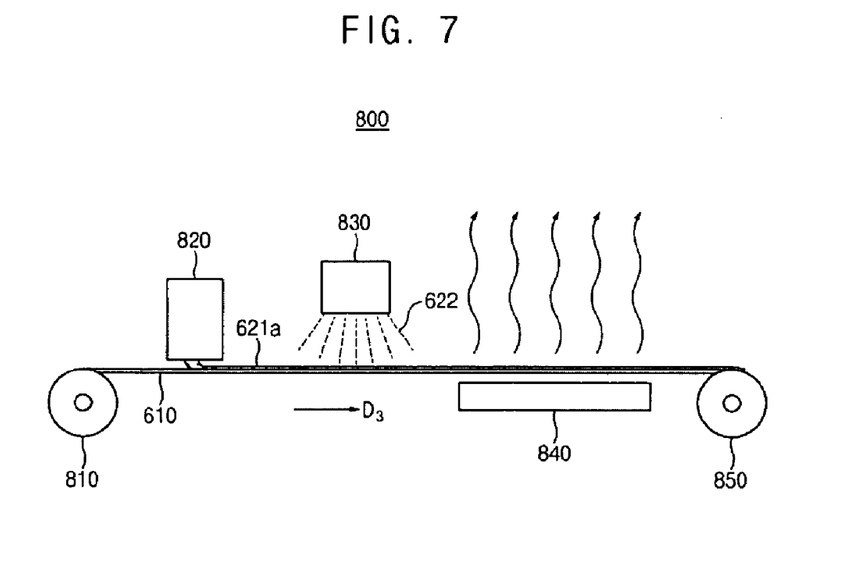
FIG. 7 is a perspective view that illustrates an apparatus for manufacturing a second polarization plate as in one embodiment of the present invention.

FIG. 7 is a perspective view that illustrates an apparatus for manufacturing a second polarization plate as in one embodiment of the present invention. Although the apparatus in FIG. 7 is employed for manufacturing the second polarization plate, a first polarization plate may be manufactured through manufacturing processes substantially identical to those of the second polarization plate using the apparatus.

Referring to FIG. 7, an apparatus 800 for fabricating a second polarization plate (refer to FIG. 1) includes a supplying roller 810, a liquid crystal coating member 820, an iodine spraying member 830, a heater 840, and a receiving roller 850.

The supply roller 810 is connected to the receiving roller 850 through a second supporting member 610. The supply member 810 is rotated in a third direction D3 so that the second supporting member 610 coupled to the supply roller 810 is moved in the third direction D3. The third direction D3 is substantially parallel to a line extended from the supply roller 810 to the receiving roller 850. The receiving roller 850 is rotated in a direction substantially identical to that of the supply roller 810 to receive the second supporting member 610 supplied from the supply roller 810.

The liquid crystal coating member 820, the iodine spraying member 830 and is heater 840 are disposed between the supply roller 810 and the receiving roller 850. The liquid crystal coating member coats the surface of the second supporting member 610 moving in the third direction D3 with a liquid crystal material 621a comprising the liquid crystal molecules 621 (see FIG. 2). Various modifications of the liquid crystal coating member 820 are shown in FIG. 9A FIG. 9B, FIG. 10, and FIG. 11.

The iodine spraying member 830 sprays iodine molecules 622 onto the liquid crystal material 621a. The liquid crystal molecules 621 have at least one hydroxyl group so that the iodine molecules 622 sprayed over the liquid crystal material 621 combine with the hydroxyl group of the liquid crystal molecules 621.

The heater 840 dries the liquid crystal material 621a combined with the iodine molecules 622 at a high temperature so that the second display polarizing layer 620 is formed on the second supporting member 610, thereby completing the second polarization plate 600.

Figure 8:
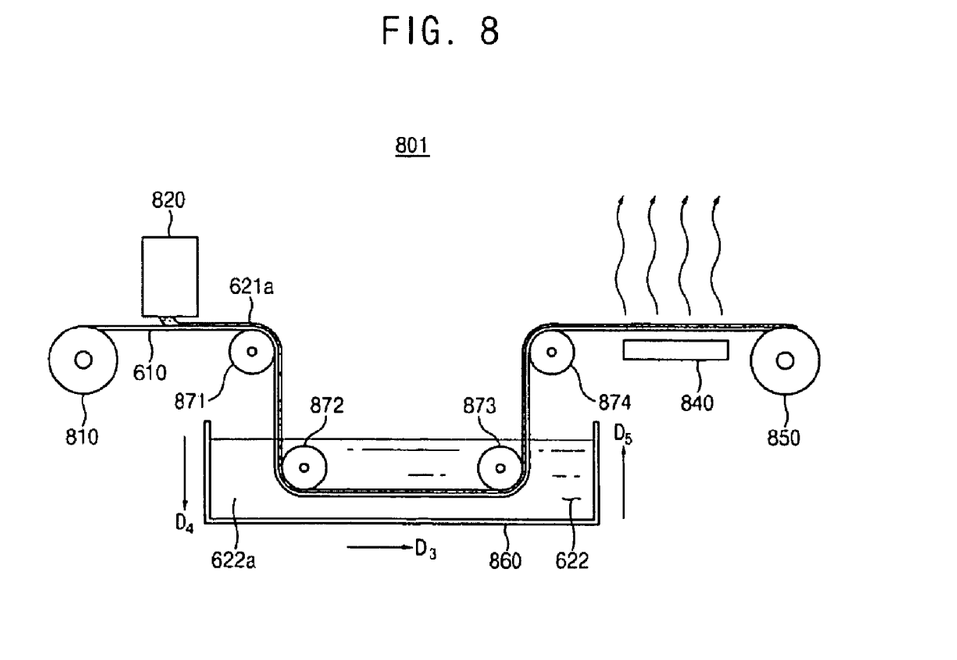
FIG. 8 is a perspective view that illustrates an apparatus for manufacturing a second polarization plate as in one embodiment of the present invention.

FIG. 8 is a perspective view that illustrates an apparatus for fabricating a second polarization plate in accordance with one embodiment of the present invention.

Referring to FIG. 8, an apparatus 801 for manufacturing a second polarization plate 600 (see FIG. 1) includes a supply roller 810, a liquid crystal coating member 820, an iodine container 860, a heater 840 and first, second, third and fourth auxiliary rollers 871, 872, 873 and 874 respectively, and a receiving roller 850.

The supply roller 810 is connected to the receiving roller 850 through a second supporting member 610. The supply member 810 is rotated in a third direction D3 so that the second supporting member 610 that is bound to the supply roller 810 is shifted in the third direction D3. The third direction D3 is substantially parallel to a line extended from the supply roller 810 to the receiving roller 850. The receiving roller 850 is rotated in a direction that is same as that of the supply roller 810 to receive the second supporting member 610 supplied from the supply roller 810.

The liquid crystal coating member 820, the iodine container 860, the heater 840, the first, second, third and fourth auxiliary rollers 871, 872, 873 and 874, respectively, are disposed between the supply roller 810 and the receiving roller 850. The liquid crystal coating member 820 coats the surface of the second supporting member 610 moving in the third direction D3 with a liquid crystal material 621a containing a plurality of the liquid crystal molecules 621 (see FIG. 2). The first auxiliary roller 871 is disposed between the liquid coating member 820 and the iodine container 860 so that the direction of movement of the second supporting member 610 changes. That is, the first auxiliary roller 871 shifts the second supporting member 610 moving in the third direction D3 to a fourth direction D4 substantially perpendicular to the third direction D3.

An iodine solution 622a comprises iodine molecules 622 is contained in the iodine container 860. The second supporting member 610 is thoroughly immersed into the iodine container 860 after the liquid crystal material 621a is coated on the second supporting member 610. The second auxiliary roller 872 shifts the second supporting member 610 immersed in the iodine container 860 while moving in the fourth direction D4 to the third direction D3. When the direction of the second supporting member 610 is changed to the third direction D3, the iodine molecules 622 in the iodine solution 622a are combined with the liquid crystal molecules 621 that include at least one hydroxyl group.

The moving direction of the second supporting member 610 is changed to a fifth direction D5 substantially opposite to the fourth direction D4 by the third auxiliary roller 873 in the iodine container 860 so that the second supporting member 610 is carried out of the iodine container 860.

The heater 840 dries the liquid crystal material 621a combined with the iodine molecules 622 at a high temperature so that the second display polarizing layer 620 is formed on the second supporting member 610. As a result, the second polarization plate 600 is completed.

The apparatuses 800 and 801 for manufacturing the second polarization plate 600 includes an iodine spraying member 830 or the iodine container 860. Alternately, the apparatuses 800 and 801 may include coloring agent supply members for supplying coloring agents and coloring agent spraying members spraying coloring agents. Further, a method and an apparatus for providing the liquid crystal molecules 621a with the iodine molecules 622 should not be limited by those described with reference to FIGS. 7 and 8.

Figure 9A:
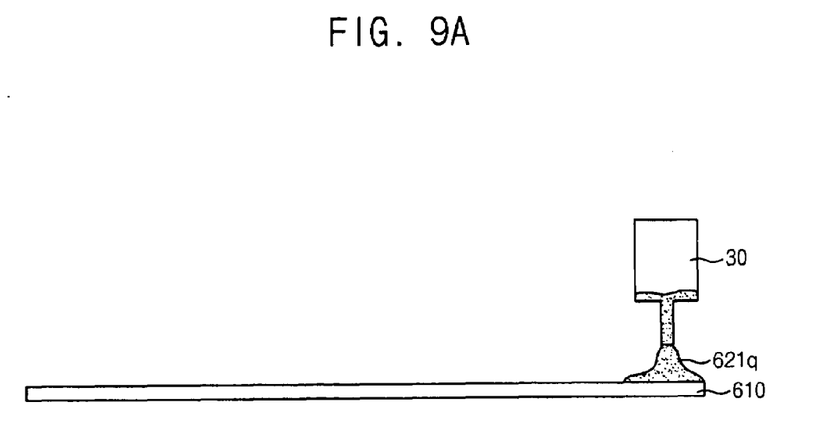
FIGS. 9A and 9B are cross sectional views that illustrate a method of coating a liquid crystal material as in one embodiment of the present invention.
Figure 9B:
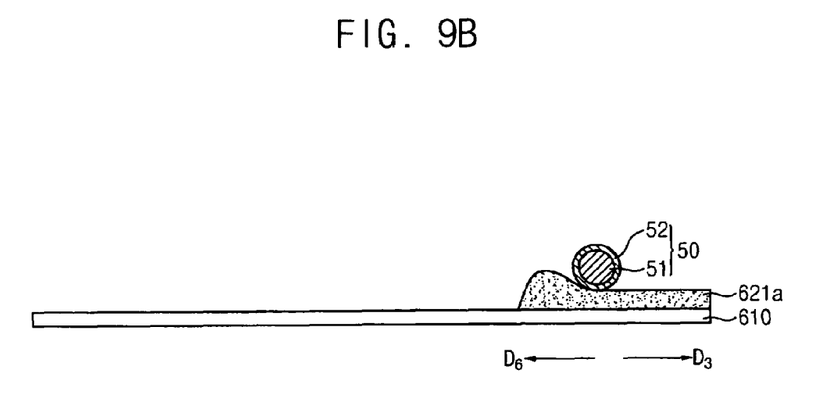

FIG. 9A and FIG. 9B are cross sectional views that illustrate a method of coating a liquid crystal material in accordance with one embodiment of the present invention.

Referring to FIG. 9A, a liquid crystal material 621a is injected to a second supporting member 610. An injecting member 30 containing the liquid crystal material 621a injects the liquid crystal material 621a onto a first end of the second supporting member 610 only.

Referring to FIG. 9B, a coating roller 50 is disposed on the first end of the second supporting member 610. When the second supporting member 610 moves in the third direction D3, the coating roller 50 is revolved by a predetermined angular velocity and is moved toward a second end of the second supporting member 610. Thus, the liquid crystal material 621a is coated on the second supporting member 610 with a substantially uniform thickness. The coating roller 50 is rotated along a sixth direction D6 opposed to the third direction D3 so that a shear stress is applied to the liquid crystal material 621a. Therefore, a plurality of liquid crystal molecules in the liquid crystal material 621a are arranged in a direction where the shear stress is applied.

Figure 10:
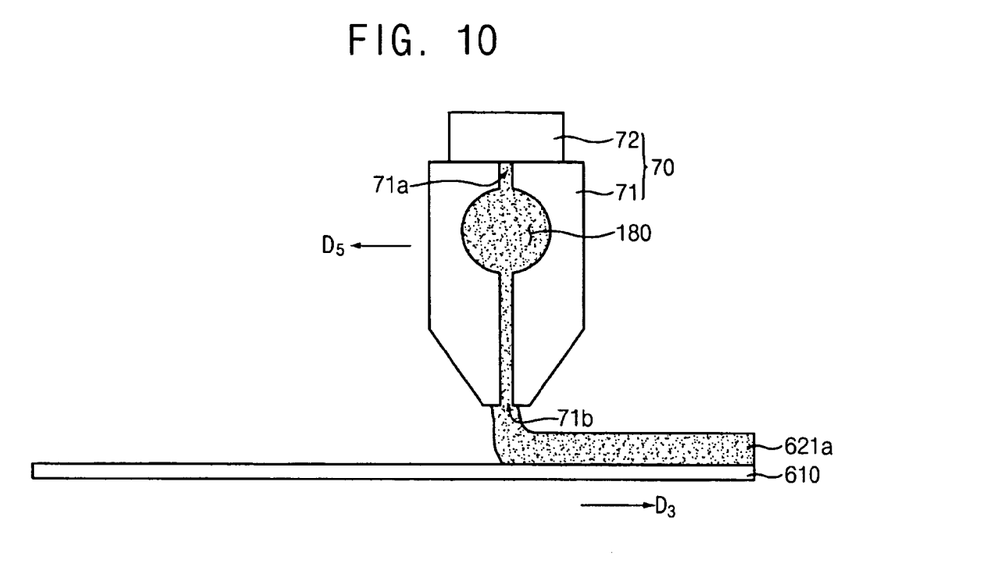
FIG. 10 is a cross sectional view that illustrates a method of coating a liquid crystal material as in one embodiment of the present invention.

FIG. 10 is a cross sectional view that illustrates a method of coating a liquid crystal material in accordance with one embodiment of the present invention.

Referring to FIG. 10, a slit coater 70 is disposed above a second supporting member 610. The slit coater includes a slit nozzle 71 and a pump 72 for providing a liquid crystal material to the slit nozzle 71. The slit nozzle 71 includes an inlet 71a and an outlet 71b for supplying that the liquid crystal material 621a.

When the second supporting member 610 moves in the third direction D3, the slit coater 70 supplies the liquid crystal material 621a from the slit nozzle 71 to the second supporting member 610 through the outlet 71b. Thus, the liquid crystal material 621a is coated on the second supporting member 610 with substantially uniform thickness.

Figure 11:
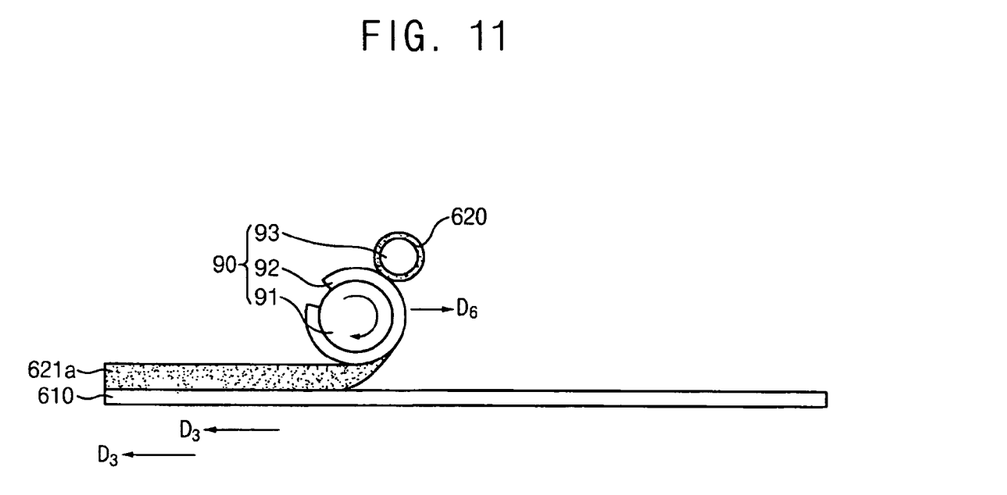
FIG. 11 is a cross sectional view that illustrates a method of coating a liquid crystal material as in one embodiment of the present invention.

FIG. 11 is a cross sectional view that illustrates method of coating a liquid crystal material in accordance with one embodiment of the present invention.

Referring to FIG. 11, a printing unit 90 is provided on the second supporting member 610. The printing unit 90 includes a printing roller 91, a printing plate 92 and a transferring roller 93. The printing plate 92 encloses the printing roller 91. The transferring roller 93 is coupled to the printing roller 91 to transfer a liquid crystal material 621a onto the printing plate 92.

When the second supporting member 610 moves in the third direction D3, the printing roller 91 rotates with a predetermined angular velocity along the six direction D6 opposed to the third direction D3. When the printing roller 91 is revolved, the liquid crystal material 621a is transferred onto the printing plate 92 contacting the transferring roller 93. Then, the liquid crystal material 621a transferred onto the printing plate 92 is coated on the second supporting member 610 according to rotation of the printing roller 91.

In the method for manufacturing the polarizer according to the present invention, because an extending process is not required, failure of the polarizer from exposure to heat or moisture is prevented thereby enhancing the productivity of the polarizer. Also, the polarizer does not require any additional protection layer for preventing an extended film from heat or moisture, thereby reducing a thickness of the polarizer.

Moreover, since the first and the second polarizing layers are provided on the color filter substrate or the array substrate, the first and the second supporting members may be omitted. Therefore, an entire thickness of the liquid crystal display apparatus may be reduced.

Having thus described exemplary embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A polarizer, comprising:
   a supporting member; and
   a liquid crystal polarizing layer disposed on the supporting member,
   wherein the liquid crystal polarizing layer comprises liquid crystal molecules and polarizing molecules,
   wherein the liquid crystal molecules include at least one hydroxyl group and are arranged in a predetermined direction, and wherein the polarizing molecules are combined with the liquid crystal molecules to absorb a light oscillating in the predetermined direction.

2. The polarizer of claim 1, wherein the polarizing molecules include iodine.

3. The polarizer of claim 1, wherein the liquid crystal molecules further comprise a compound having the following chemical Formula (1):

Formula (1)

wherein M denotes a cation,
wherein R is selected from the group consisting of hydrogen (H), bromine (Br) and a hydronitride aryl group,
wherein n is 2 or 3, and
wherein m is an integer between and including 1 and 4.

4. The polarizer of claim 1, wherein the liquid crystal molecules comprise a compound having the following chemical Formula (2):

Formula (2)

wherein M denotes a cation,
wherein R denotes hydrogen (H),
wherein n is an integer between and including 2 and 4, and
wherein m is an integer between and including 1 and 4.

5. The polarizer of claim 1, wherein the liquid crystal molecules comprise a compound having the chemical Formula (3):

Formula (3)

wherein M denotes a cation,
wherein R denotes hydrogen (H),
wherein n is an integer between and including 2 and 4, and
wherein m is an integer between and including 1 and 4.

6. The polarizer of claim 1, wherein the supporting member comprises a flexible film or a glass substrate.

* * * * *